United States Patent [19]
Rossi

[11] Patent Number: 5,650,868
[45] Date of Patent: Jul. 22, 1997

[54] DATA TRANSFER SYSTEM

[75] Inventor: Markku J. Rossi, Houston, Tex.

[73] Assignee: Compaq Computer Corporation, Houston, Tex.

[21] Appl. No.: 484,286

[22] Filed: Jun. 7, 1995

[51] Int. Cl.$^6$ .................... H04B 10/08; H04B 10/00
[52] U.S. Cl. ............. 359/110; 359/152; 455/67.4; 455/73; 364/713; 375/224
[58] Field of Search ............... 359/143.11, 145, 359/152, 172, 177, 154; 455/73, 67.4; 364/713; 375/213, 224, 227

[56] References Cited

U.S. PATENT DOCUMENTS

| | | | |
|---|---|---|---|
| 3,290,503 | 12/1966 | Staufenberg et al. | 250/199 |
| 4,409,477 | 10/1983 | Carl | 250/227 |
| 4,571,712 | 2/1986 | Romano et al. | 369/44 |
| 4,686,678 | 8/1987 | Ohta et al. | 372/33 |
| 4,691,385 | 9/1987 | Tupman | 359/152 |
| 4,696,062 | 9/1987 | LaBudde | 455/612 |
| 4,808,804 | 2/1989 | Krichever et al. | 235/462 |
| 4,838,631 | 6/1989 | Chande et al. | 350/6.6 |
| 4,868,893 | 9/1989 | Hammond | 319/143 |
| 4,919,499 | 4/1990 | Aiba | 350/6.6 |
| 4,927,226 | 5/1990 | Ortiz, Jr. | 455/611 |
| 5,015,064 | 5/1991 | Detig et al. | 350/96.24 |
| 5,109,459 | 4/1992 | Eibert et al. | 385/115 |
| 5,181,216 | 1/1993 | Ackerman et al. | 372/36 |
| 5,214,531 | 5/1993 | Torii et al. | 359/223 |
| 5,245,649 | 9/1993 | Eaton et al. | 379/67 |
| 5,278,687 | 1/1994 | Jannson et al. | 359/124 |
| 5,296,724 | 3/1994 | Ogata et al. | 257/98 |

FOREIGN PATENT DOCUMENTS 2192665  1/1988  United Kingdom ........... 359/143

Primary Examiner—Kinfe-Michael Negash
Attorney, Agent, or Firm—Jenkens & Gilchrist

[57] ABSTRACT

An electromagnetic data transmission system is disclosed wherein a first and a second data link are connected between a transmitter CPU and a receiver CPU. The first data link, which is for transmitting data with high throughput rates, has a multi-directional electromagnetic transmitter at the transmitting end which can transmit electromagnetic signals in a plurality of different directions over three different dimensions and an electromagnetic receiver at the receiving end. The second data link, which is for providing status and feedback information, has a wide beam electromagnetic transmitter at the transmitting end and an electromagnetic receiver at the receiving end. The inventive method herein, then, includes the steps of transmitting a plurality of test signals in each of the directions of the multi-directional electromagnetic transmitter of the first data link, determining which of the test signals were received most clearly, and finally transmitting data in a number of optimal transmission directions.

17 Claims, 5 Drawing Sheets

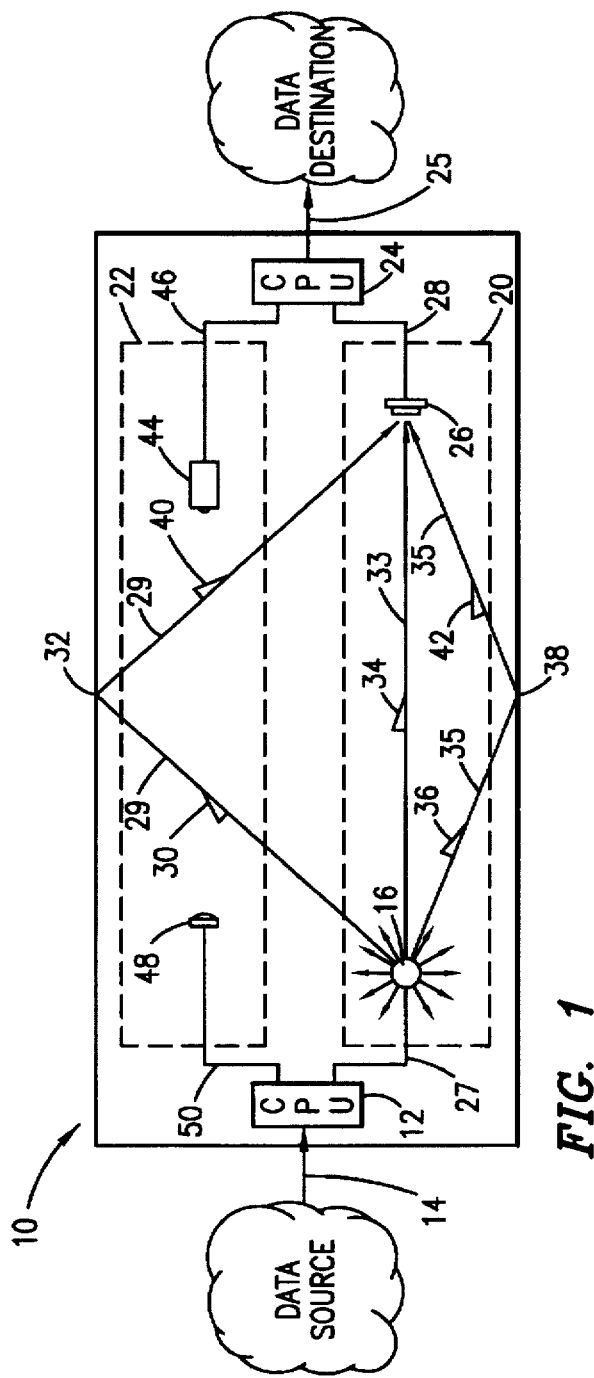
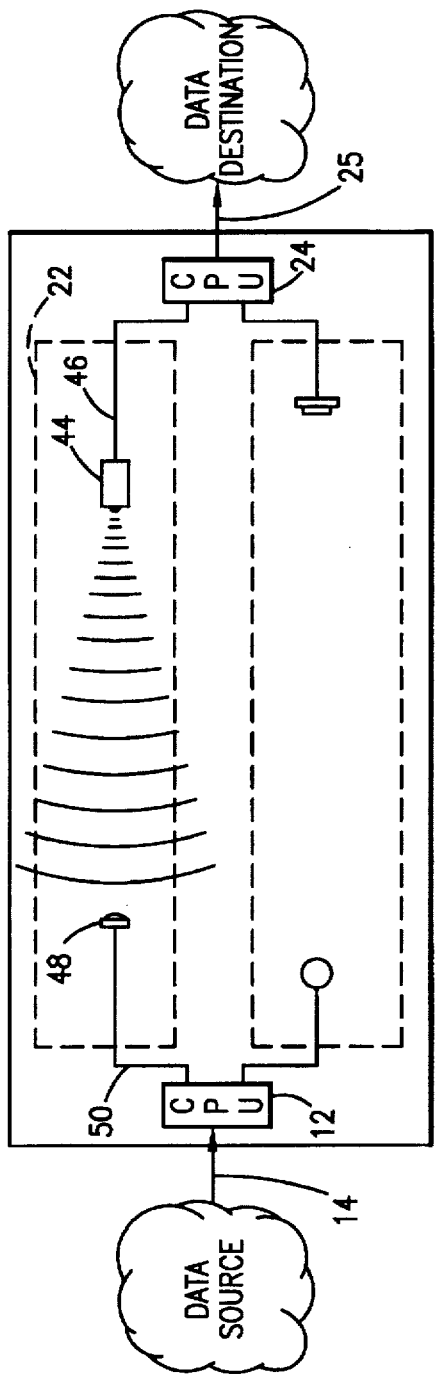
FIG. 1
FIG. 2

DATA TRANSFER SYSTEM

BACKGROUND OF THE INVENTION

1. Field of the Invention

This invention relates to signal transmission systems and more particularly to systems for transmitting and receiving modulated rays of electromagnetic radiation, such as visible light or near visible light.

2. Description of the Related Art

The art of light communication between distant points is old. The fundamental goal in this art is to use light to effect a transfer of data from a data source to a data destination. It is well known that light communications in a controlled medium such as a fiber optic disc can yield high data throughput rates. Accordingly, there exists a significant amount of disclosure in the prior art relating to fiber optic communications devices and systems. Because the fiber optic cable can be used to conduct beams of light, the path of the light beams as well as their diminishing intensity due to divergence can be controlled. By some estimates, a fiber optic cable can carry approximately 40 times more information than can a standard electric cable.

Without question, transmission of data optically versus by wire means is becoming more and more prevalent. Numerous reasons exist for preferring optical transmission of data, as opposed to electrical transmission. These reasons include less bandwidth limitations, lack of electrical interference, reduced weight, and reduced bulk. Optical data transmission can provide huge bandwidth characteristics, extremely low loss even over long distances and immunity to electrical interference even in environments saturated with electronics such as aircrafts. Resultingly, light based communications and even data storage devices are under wide scale development.

Given the amount of cabling that current office and home environments must have in order to provide power, voice carrying capabilities, data carrying capabilities, etc., there is a need to reduce the amount of cabling to facilitate movement of equipment, aesthetics, and even safety. Accordingly, cableless electromagnetic communications systems and especially light based communications systems seem to offer potential for carrying signals with sufficient throughput capability for handling voice information and data.

As fiber optic technologies have evolved, cableless data transmission systems based upon light signals have also been pursued. Some references teach that "wireless" or cableless remote controls may utilize infrared transmitters and receivers to relay information relating to user selected options, e.g., the remote control for the television. Thus, infrared communications devices are already being employed for devices which do not have high data throughputs, e.g. remote controls for stereo and television equipment. Such devices produce a wide angle diverging signal which reaches its destination infrared receiver because of the relatively low frequency or long period of its signals and because of the lenses used for such transmitters. Such lenses allow the light beams to diverge in order to insure that a signal is received by the infrared receiver without absolute precision in aim.

A drawback, however, to such systems for data transfer is that low frequency signals must be used because of the divergent characteristic of emitted beam. The range of a light beam, for data transfer purposes, is proportional to its density. Therefore, a diverging light beam pattern will have shorter range capabilities. By some estimates, the luminous intensity of light is ten times greater with a narrow beam than with a wide beam. Thus, a narrow beam has a range that is over 3 times longer (square root of ten—the difference in intensity). Thus, it has been recognized that data throughput rates may be increased by focusing the light beam to produce a relatively non-divergent beam of light. A problem with use of focused beams, however, is that precise aim must be used, especially for long range transmissions, in order for the signal to illuminate the infrared receiver. Additionally, the beam of light may easily be momentarily blocked by a object moving through its path. Thus, data transfer is interrupted and perhaps either terminated or at least degraded.

SUMMARY OF THE INVENTION

In accordance with the present invention there is provided an apparatus and a method. Regarding the apparatus, a transmitter CPU and a receiver CPU having two data links therebetween, a first data link for transferring data at high throughput data rates and a second data link for providing feedback information is disclosed. The first data link comprises a multi-directional electromagnetic beam transmitter which is capable of transmitting a highly focused beam in a plurality of directions. At the receiving end of the first data link is an electromagnetic receiver, which is connected to the receiver CPU, to which the electromagnetic receiver electrically transmits the detected electromagnetic signals. The receiver CPU, which is also electrically connected to an electromagnetic transmitter at the transmitting end of the second data link, determines which data transmissions were received most clearly and transmits such information to the transmitter of the second data link. At the receiving end of the second data link, an electromagnetic receiver which receives the feedback information is electrically connected to the transmitter CPU. Accordingly, with the first and second data links, there is provided a capability for determining and indicating to the transmitter CPU which of the signals being transmitted in the plurality of directions are received most clearly. Thus, the apparatus allows the data transmission system to determine and optimize electromagnetic signal transmissions. One type of electromagnetic signal generated and received within the two datalinks is infrared. However, the invention may be adapted for other types of electromagnetic beams such as coherent laser beams, radio waves, etc.

The method of the invention herein includes transmitting a known test signal in each of a plurality of predetermined directions for which the multi-directional electromagnetic transmitter is capable of transmitting, and determining from feedback provided by a receiver CPU a number, for example 3, of optimal directions for data transmission. Thereafter, data is transmitted in each of those optimal directions until the data is not correctly received or until all of the data has been transferred. If the data has not all been transferred and an interruption in the data flow occurs, then the whole process, or a portion thereof, is reinitiated to transfer the remaining data. Accordingly, the apparatus and method herein enable a user to utilize data links with highly focused long range electromagnetic beams over a wide angle of space for greater distances than has been heretofore possible.

BRIEF DESCRIPTION OF THE DRAWINGS

A more complete understanding of the method and apparatus of the present invention may be had by reference to the following Detailed Description when taken in conjunction with the accompanying Drawings wherein:

FIG. 1 is a block diagram of the data transmission system emphasizing the first data link;

FIG. 2 is a block diagram of the data transmission system emphasizing the second data link;

3

Figure 5:
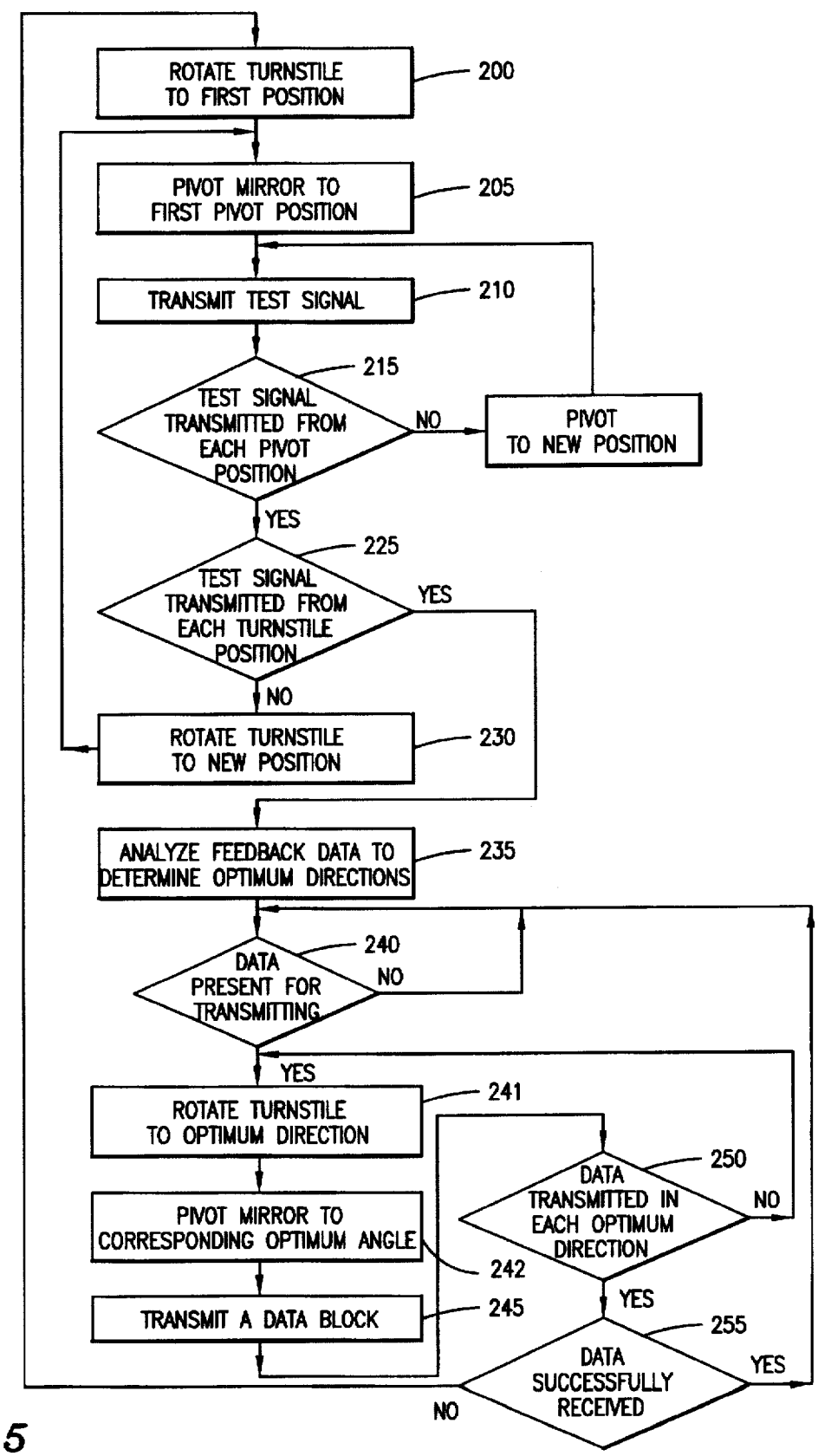
Figure 6:
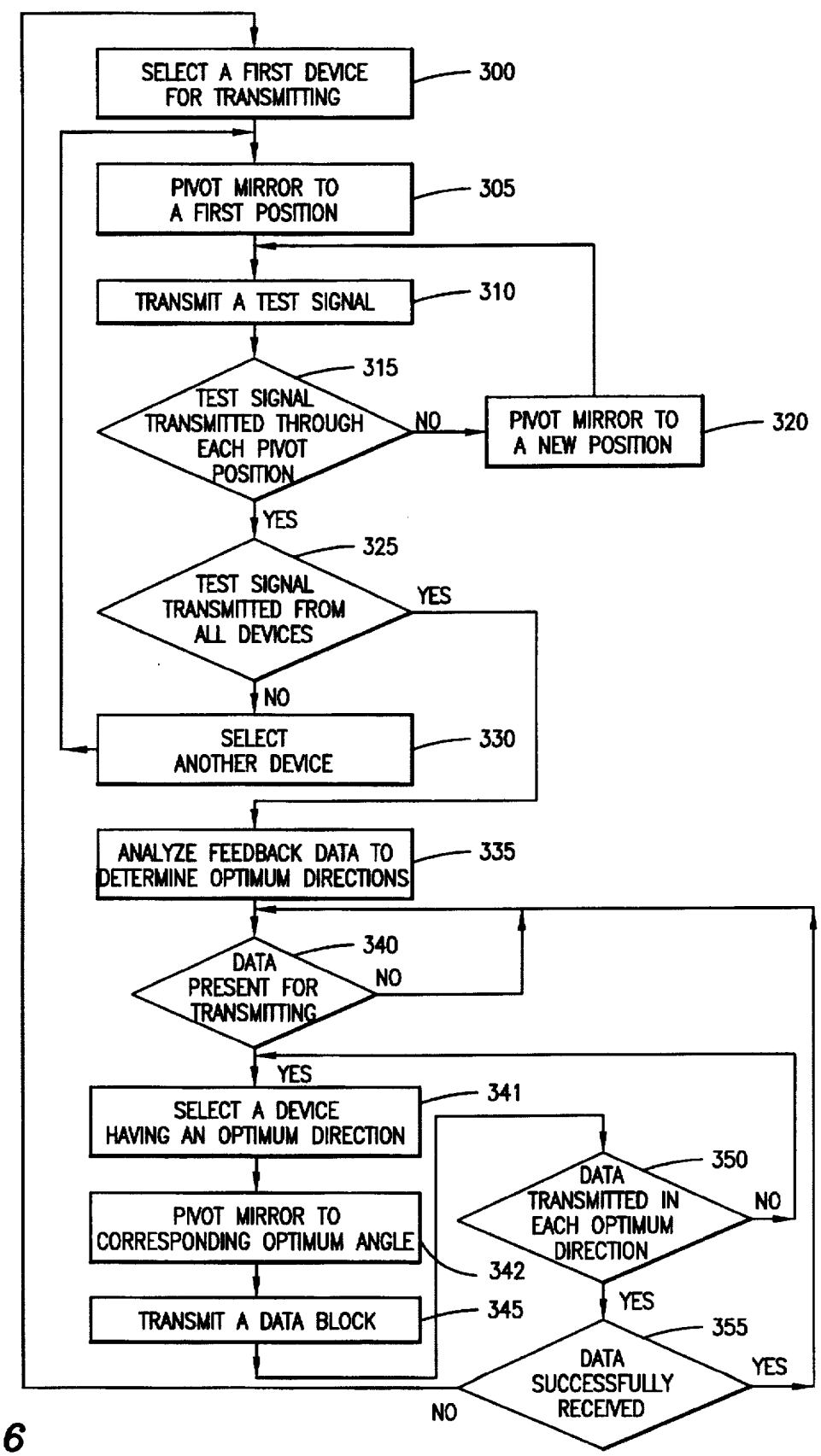
Figure 7:
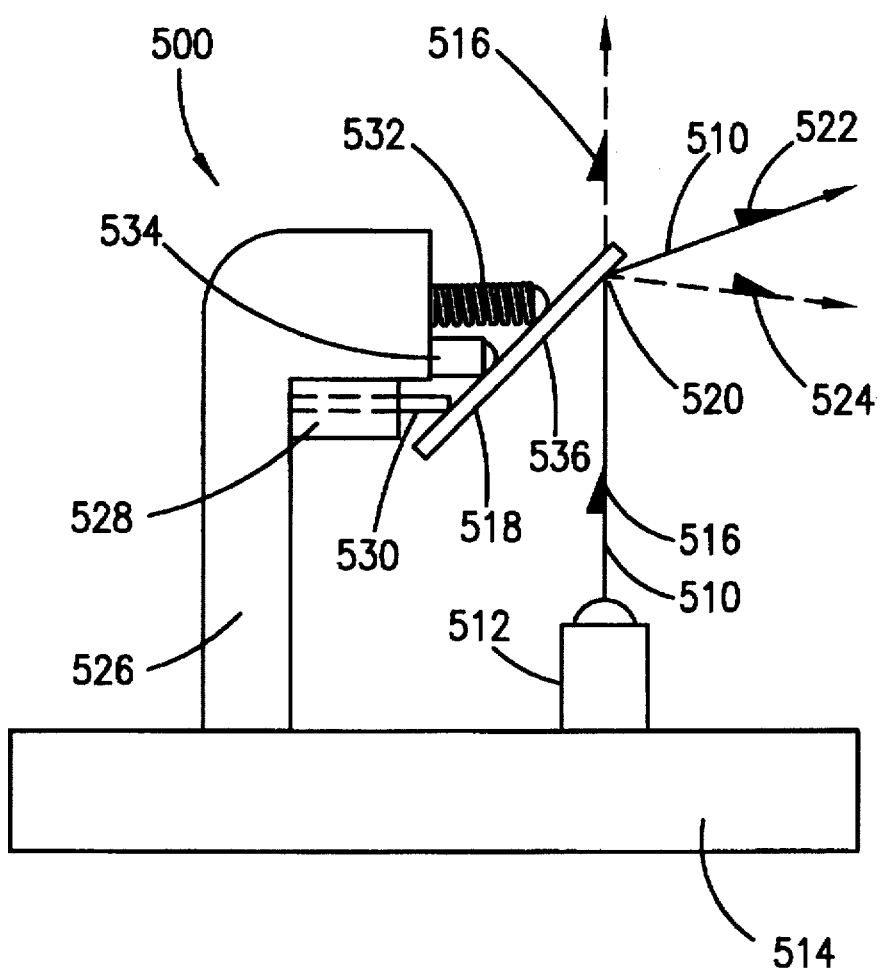

FIG. 5 is a diagram listing the steps of transmitting data with an embodiment of the invention;

FIG. 6 is a diagram listing the steps of transmitting data with an alternative embodiment of the invention; and FIG. 7 is a side view of an alternative embodiment of the multidirectional transmitter.

DESCRIPTION OF THE PRESENT PREFERRED EXEMPLARY EMBODIMENTS

The invention herein, as shown in FIG. 1, comprises a data controller (or "transmitter") CPU 12, a first data link 20, a second data link 22 and a receiver CPU 24 for providing an infrared data transmission system having high data throughput capabilities. The controller and receiver CPU's 12 and 24 are connected to opposite ends of each of the two data links 20 and 22 wherein the first data link 20 serves to transmit test signals and data received over line 27 from the controller 12 to the data receiver 24 over line 28. The second data link serves to transmit status information received over line 46 from the data receiver 24 to the controller 12 over line 50.

The first data link 20 is comprised of a wide angle narrow beam infrared transmitter 16 having the capability of transmitting infrared signals in a plurality of directions and an infrared receiver 26 for receiving such signals. The transmitter 16 described herein is electrically connected to the controller 12 while the receiver 26 herein is electrically connected to the data receiver 24.

Second data link 22 may either be very similar in architecture to the first data link 20 or may vary. In one embodiment the second data link 22 is comprised of the same infrared transmitter of the first data link 20, the transmitter 44 of the second data link 22 being connected to the data receiver 24 and the infrared receiver 48 of the second data link 22 being electrically connected to the controller 12. In another embodiment, the infrared transmitter 44 of the second data link 22 is a wide angle transmitter which produces a wide infrared beam having lower data throughput capabilities than the infrared transmitter 16 of the first data link 20. In yet another embodiment of the second data link 22, the second data link 22 is comprised of a radio frequency transmitter and receiver. Other embodiments are possible, and should readily occur to those skilled in the art. For embodiments where the second data link 22 is used primarily for transmitting status signals and the like, the second data link 22 is not required to have high throughput capabilities of the first data link 20 since the first data link 20 is used primarily for transmitting data at high throughput rates.

Continuing to refer to FIG. 1 the data transmission system 10 establishes an infrared data path between an originating data source and a terminating data destination. Specifically, a data source provides external data to the data transmission system 10 over line 14 which connects the external data source to the transmitter CPU 12. Accordingly, because the transmitter CPU 12 is electrically connected to a receiver as well as a transmitter, a system provided herein is capable of including an infrared feedback loop to transmitter CPU 12. Such a feedback loop provides information to the CPU 12 enabling it to optimize data transmission from its multi-directional infrared transmitter 16 to the infrared receiver 26 at the receiving end of the first data link 20.

In embodiments such as that described immediately above, the transmitter CPU 12 further comprises a processor having the capability to analyze information provided through the feedback loop to determine optimum transmission characteristics and then direct transmission of the infrared signals in those optimum directions. While the embodiment of the data transmission system 10 shown in FIG. 1 depicts the transmitter CPU 12 and receiver CPU 24

4 as discrete units, the functions of processors 12 and 24 may be performed by a CPU which forms a part of another system, e.g., one including the external data source. Similarly, a receiver CPU 24 which processes the data and provides information for the feedback loop through the second data link 22 may also be a discrete component or a part of a CPU including a CPU within the data destination, e.g., a printer.

To further define the capabilities of the transmitter CPU 12, an understanding of the multi-directional infrared transmitter 16 is required.

The multi-directional infrared transmitter 16 of the first data link 20 is an apparatus having the capability to transmit a focused infrared beam in a plurality of directions. For example, in one embodiment of the invention herein, the multi-directional infrared transmitter has the capability of transmitting the focused infrared beam in at least 24 different directions. Thus as is shown in FIG. 1 the transmitter CPU 12 generates a signal which is transmitted to the multi-directional infrared transmitter 16 over line 27. Upon receipt of such a signal over line 27, the multi-directional infrared transmitter 16 converts the signal to an infrared format and transmits the signal a plurality of times in a plurality of directions. In the embodiment of FIG. 1, transmitter CPU 12 sends a test signal over line 27 twenty four times, each time with a signal indicating to the multi-directional infrared transmitter 16 in which direction the infrared transmission is to occur. In an alternative embodiment, the transmitter 16 receives the test signal just once and then transmits the test signal in each of the plurality of directions. In this embodiment, the processor CPU 12 transmits a signal to the transmitter 16 indicating the optimum directions for transmission on a periodic basis or at least whenever there is a change from the last specified optimum directions. Thus, in this embodiment, transmitter 16 has the capability to control its transmission directions on a per transmission basis.

At the receiving end of the first data link, some, if not all, of the transmitted test signals are received. As each of the signals is received, the infrared receiver 26 of the receiving end of the first data link 20 transmits the received signal to receiver CPU 24 over line 28. The receiver CPU 24 then analyzes each of the received signals to determine which signals were received the most clearly. In the embodiment of FIG. 1, receiver CPU 24 determines which three signals were received the most clearly. Thus as is shown, a signal 29 which leaves the transmitter 16 in a direction 30 towards a reflection point 32, a signal 33 which leaves the transmitter 16 in direction 34 directly towards the infrared receiver 26, and a signal 35 which leaves the transmitter 16 in a direction 36 towards a reflection point 38 are the three signals received the most clearly by infrared receiver 26, as determined by CPU 24. Note that the signal 29 is received in the infrared receiver 26 after traveling in a direction 40 after reflecting off reflection point 32. Similarly, the signal 35 originally transmitted in direction 36 is received in the infrared receiver 26 after traveling in a reflected direction 42.

A problem which the receiver CPU 24 must address is determining the identity of the signal transmission. For example, if transmission 7 in a series of transmissions is not received, then receiver CPU 24 must be made aware that a next received signal was actually the 8th signal transmitted and not the 7th. One way to positively identify a signal is to examine the timing at which the signal was received in relation to known quantities such as the time elapsed since the last signal was received. Another solution is to positively identify a transmitted signal. In one embodiment of FIG. 1, for example, every test signal includes an identification of the signal number so that it may be identified unambiguously.

Continuing to refer to FIG. 1, a wide beam infrared transmitter 44 is connected to receiver CPU 24 by line 46. After receiver CPU 24 determines which of the plurality of test signals were received the most clearly, receiver CPU 24 sends to wide beam infrared transmitter 44 over line 46 a signal reflective of its determination. The wide beam infrared transmitter 44 then transmits a signal to the second infrared receiver 48 at the receiving end of the second data link 22. The second infrared receiver 48 then transmits to transmitter CPU 12 over line 50 a signal reflecting a received infrared signal received from wide beam infrared transmitter 44. Accordingly, the second data link 22 provides the feedback to transmitter CPU 12 indicating which of the plurality of test signals were received the most clearly. The transmitter CPU 12 is therefore able to determine which directions should be used for transmitting data received over line 14 from an external data source to a receiver 24 and ultimately to a data destination over line 25.

Regarding the second data link 22, the embodiment of FIG. 1 includes a wide beam infrared transmitter 44 at the transmitting end of the second data link as is emphasized in FIG. 2. There are of course other options. In another embodiment, the wide beam infrared transmitter comprises a multi-directional infrared transmitter 16 similar to that found in the first data link 20. Such a multi-directional infrared transmitter 16 would be desirable if, for instance, high data rates are expected to be transmitted from the first end of the second data link 22 to the receiving end of the second data link 22.

Alternatively, second data link may comprise other types of transmitters and receivers which are appropriate for the type of data to be carried by the second data link 22. For example, a wide beam infrared transmitter for the second data link 22 would be well suited for carrying feedback and status information but not for carrying data at high throughput rates as is done in the first data link.

Figure 3:
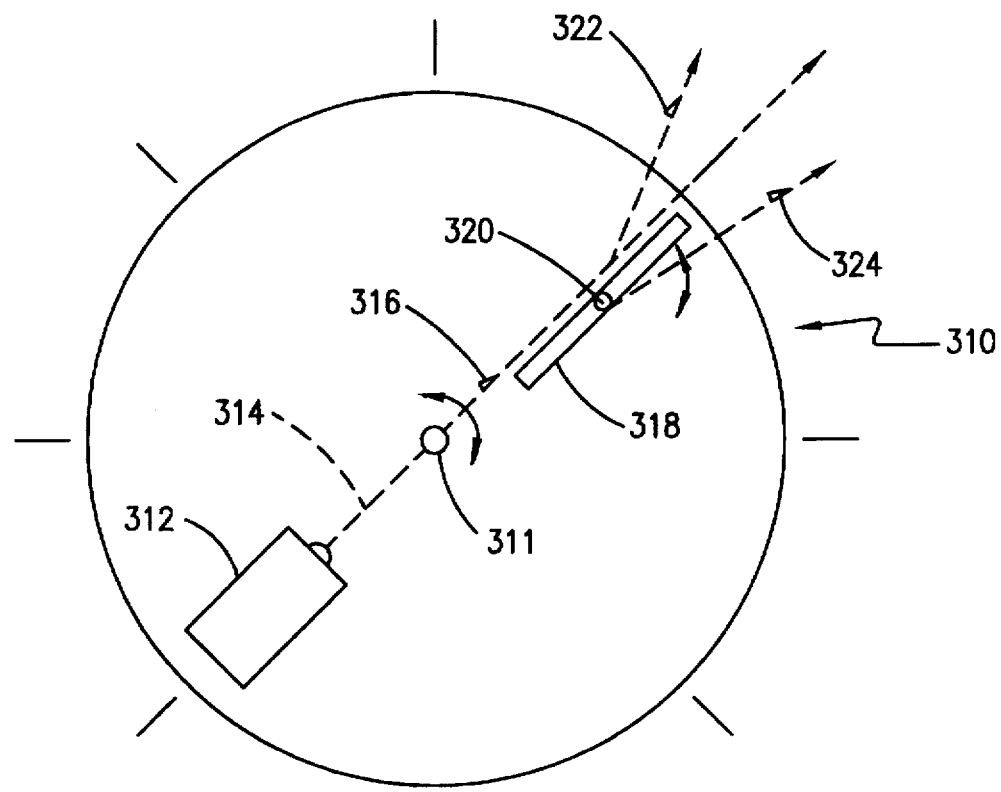
FIG. 3 is a top view of a turnstile for one embodiment of the multi-directional infrared transmitter.

Referring now to FIG. 3, there is shown one embodiment of the multi-directional infrared transmitter 16 of FIG. 1. As is seen in FIG. 3, an infrared transmitting device 312 is rigidly mounted upon a turnstile 310 which rotates about an axis 311. Accordingly, in the embodiment of FIG. 3, the turnstile 310 rotates about axis 311 to eight different positions. There is also shown a mirror 318 pivotedly mounted on turnstile 310 so as pivot about pivot point 320 and to reflect the focused light beam 314 in a number of predetermined relative positions. By way of example, the mirror 318 may be angled about ±11¼° from axial center so that light beam 314 traveling in direction 316 is reflected by mirror 318 to travel in directions 322 or 324. In the embodiment of FIG. 3, direction 322 is about (−)22.5° and direction 324 is about (+)22.5° with respect to direction 316. Additionally, the mirror 318 may be pivoted to be parallel to direction 316 of the focused beam 314 thereby allowing focused beam 314 to pass unreflected. It follows, therefore, that for any of the eight different positions of the turnstile, that the light beam 314 from the infrared transmitting device 312 may be reflected by mirror 318 or allowed to pass in one of three directions. Accordingly, 24 different directions are possible.

In another embodiment of the same invention, the mirror 318 is adapted to reflect the light beam in any one of four directions, instead of two directions as is shown in FIG. 3, as well as allowing the light beam to pass through unreflected. Thus, the light beam 314 may be directed from the turnstile in a total of 40 different directions because the turnstile has 8 different positions. As may be seen, a combination of the mirror and the turnstile effectively functions to allow a light beam to be transmitted in at least 40 different directions.

Figure 4:
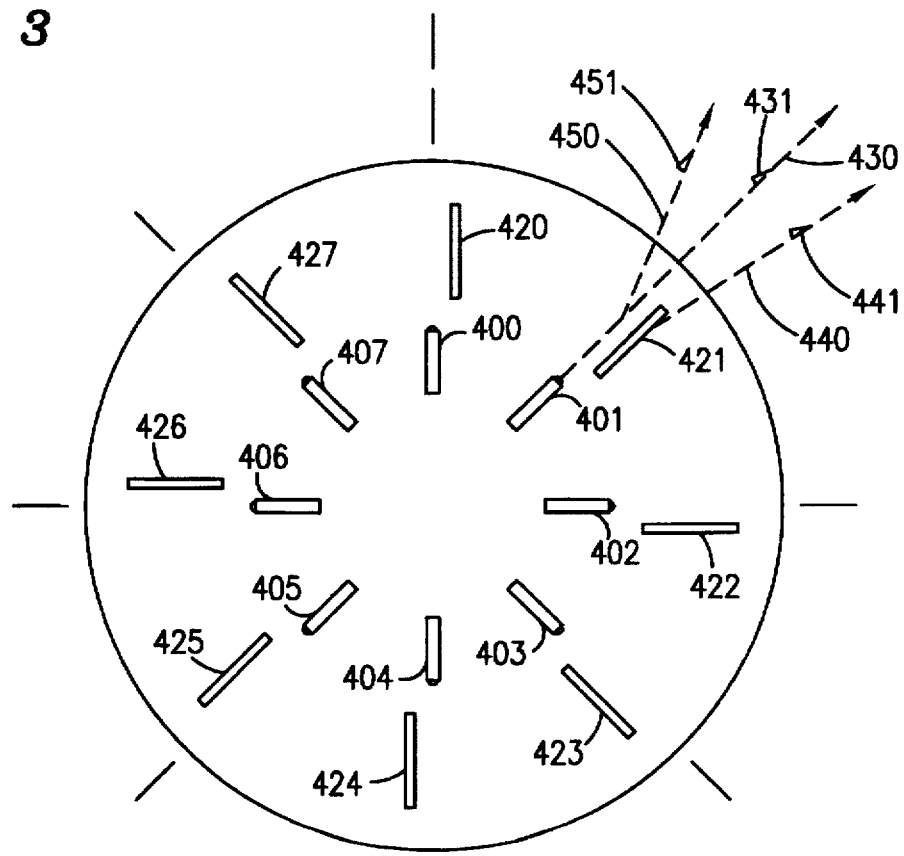
FIG. 4 is a top view of an alternative embodiment of the multi-directional infrared transmitter.

Another embodiment which allows for the transmission of infrared light beams in a plurality of directions is the embodiment of FIG. 4. FIG. 4, instead of using a turnstile, uses a plurality of infrared transmitting devices 401–408. Additionally, as is shown in FIG. 4, a plurality of mirrors 421–428 are pivotedly mounted in close proximity to each of the infrared transmitting devices 401–408 to reflect the focused light beam in a plurality of directions in a manner very similar to that discussed for turnstile 310 of FIG. 3.

The method of the present invention is a function of the specific embodiment of the apparatus. Broadly, however, the inventive method includes the general steps of determining the optimum directions for the transmission of the infrared beams, i.e. which directions will allow for the most clear transfer of data, and then transmitting the data in the optimum directions. In order to determine the optimum directions, a test signal is sent in each of the plurality of predetermined directions. Accordingly, referring to FIG. 5, the first step of the inventive method is step 200 which includes rotating the turnstile to a first turnstile position. Step 205 includes pivoting a mirror to a first pivot position. At this point, the turnstile and mirrors are in a first test position for the first transmission of a test signal. Therefore, step 210 includes transmitting a test signal from the first test position. Step 215 then is to determine whether a test signal has been transmitted in every pivot position, namely a first, a second and a third pivot position, for a given turnstile position. If not, step 220 includes pivoting the mirror to a new pivot position. Thereafter, step 210 is repeated and a test signal is transmitted from the new pivot position. Once again, step 215 is followed to determine whether every pivot position for a given turnstile position has been utilized for transmitting a test signal.

Once every test position or pivot position for a given turnstile position has been used to transmit a test signal, step 225 involves determining whether test signals have been transmitted from every turnstile position. If not, step 230 includes the step of rotating the turnstile to a new turnstile position. Thereafter, the process of transmitting the test signals in every pivot position as previously discussed, is performed once again, starting with step 205.

Once a test signal has been transmitted in each of the predetermined test positions, namely once for every turnstile position and pivot position in combination, then step 235 includes analyzing feedback information provided through a feedback loop, or more specifically, through the second data link 22 of FIG. 1, to determine a number of optimum directions for transmitting data. More specifically, this step 235 includes analyzing each of the plurality of transmissions test signals and determining which number were received the most clearly. If, by way of example, the receiver CPU 24 of FIG. 1 makes the determination, then this step 235 includes a step of transmitting the results from such analysis through the second data link 22 to the transmitter CPU 12 of FIG. 1. In the embodiment of FIG. 5, three optimum directions are determined. However, this number may be varied according to user requirements.

Step 240, involves determining whether there is data that is present for transmitting. If there is no data present for transmitting, the data transmission system 10 waits until data is present. Once a determination is made in step 240 the data is present to transmit, step 245 includes transmitting a block of data in one of the optimum directions. Step 250 then includes determining whether a given data block was transmitted in each of the optimum directions. If not, then step 245, namely transmitting a block of data, is performed for another optimum direction. Then, in step 250, once the data block has been transmitted in each of the optimum directions, step 255 includes analyzing a signal reflecting whether the data block was correctly received by the first infrared receiver 26 at the receiving end of the first data link 20. If it was, then step 240 is repeated to determine whether there is more data to transmit which is present. However, if the data was not received properly, as determined in step 225, then data transmission is temporarily suspended until a number of optimum directions is determined once again. More specifically, the whole process starts over with step 200 to determine the pivot and turnstile position which result the optimum transmission directions. Once new optimum transmission directions have been determined, data transmission resumes as is shown in steps 240 through 255.

Referring now to FIG. 6, an alternative method of the present invention is illustrated in flow chart form. In FIG. 6, step 300 includes selecting a first infrared transmitting device for transmitting an infrared beam. Then, step 300 includes a step of pivoting a mirror which is pivotally mounted in close proximity to a light beam produced by the first device for transmitting an infrared beam when the mirror is pivoted to a first pivot position. Thereafter, step 310 includes transmitting a test signal. Thereafter, step 315 includes determining whether the test signal has been transmitted through each of the pivot positions for the given device for transmitting. If not, step 320 includes pivoting the mirror to a new position and then going to step 310 which is to transmit a test signal. Once the test signal has been determined by step 315 to have been transmitted for each pivot position, then step 325 includes determining whether the test signal was transmitted from all of the devices of the multi-directional infrared transmitter 320 of FIG. 4. If not, then another device is selected in step 330 prior to reentering the sequence of steps starting with step 305 which is to pivot the mirror to a first position as previously described for transmitting the test signal once from each pivot position for the selected device.

Once it is determined in step 325 that the test signal has been transmitted from all devices, then step 335 includes analyzing feedback to determine the optimum transmission directions. Thereafter, the next step is step 340 which is determining whether data is present and available for transmitting. If not, this step is repeated until data is available. If data is available, then a device is selected having an optimum direction in step 341. Then, step 342, pivoting the mirror to a corresponding optimum pivot position for the selected device. Thereafter, step 345 includes transmitting a data block and then in step 350, determining whether the data block has been transmitted in each of the optimum directions. If not, then step 341 is repeated again wherein a transmission occurs for each device and the corresponding optimum pivot position is identified as defining one of the number of optimum directions. Once the determination is made in step 350 that the data has been transmitted in each of the optimum directions, the final step includes, in step 355, determining whether the data blocks were received without error. If they were, then step 340 is repeated with the subsequent steps. Specifically, if more data is present for transmission, the steps for transmitting data in an optimal direction are repeated until all data has been transferred. On the other hand, if in step 355, the determination is made that data was not received properly, then the entire process of determining optimal data transmission directions and then sending the data in those directions is repeated. Of course, as before with FIG. 5, data transmission does not begin anew but from where the system left off, specifically, resending the first data block which was not successfully transmitted before.

Referring now to FIG. 7, there is shown another embodiment of the invention herein. The turnstile 500 is adapted for transmitting the electromagnetic beam 510 in a plurality of three dimensional directions. As may be seen in FIG. 7, an electromagnetic beam generating device 512 is mounted upon a turnstile base 514 in a manner which results in the beam generating device 512 transmitting a beam 510 in a vertical direction 516. The beam 510 is then reflected by a mirror 518 at a reflection point 520. After being reflected, beam 510 travels in a reflected direction 522.

The reflected direction 522 is a function of the position of the mirror 518. If mirror 518 is positioned to be nearly vertical, then beam 510 passes by mirror 518 in direction 516 without being reflected. As mirror 518 is repositioned to any one of a theoretically infinite number of positions, beam 510 direction can range from not being reflected and traveling in direction 516 to a maximal amount of reflection which results in the beam 510 traveling in direction 524. As may be seen in FIG. 7, direction 524 is approximately horizontal. The actual maximal amount of reflection, however, is merely a function of the mechanical arrangement of components utilized in positioning the mirror. Depending upon this mechanical arrangement, the range of reflected positions can vary from what is shown in FIG. 7 and will vary according to the design choices made of one skilled in the art.

One apparatus for positioning the mirror 518 is shown in FIG. 7. As may be seen, a frame 526 is mounted vertically on turnstile 514 to support the mirror 518 and the mirror positioning mechanisms. In the embodiment of FIG. 7, the mirror positioning mechanism is comprised of a piezoelectric element 528 which includes a piezoelectric rod 530, a spring 532 and a projection 534 which forms a mirror pivot point 536.

In the embodiment of FIG. 7, both the piezoelectric rod 530 and the spring 532 push against the mirror 518. Thus, the voltage level applied to the piezoelectric element 528 determines the amount of force which is applied to the mirror 518 by the piezoelectric rod 530 in a horizontal direction. The relationship between the force applied to the mirror 518 by the piezoelectric rod 530 and by the spring 532, each being on opposite sides the pivot point 536, affects the position of mirror 518. Generally, it is important to select a spring having compression force within the range of or less than the force produced by the piezoelectric element 528 so that piezoelectric element 528 may be used to determine the actual position of mirror 518.

In the embodiment of FIG. 7, two predetermined voltage levels are applied to the piezoelectric element 528 resulting in there being two predetermined mirror 518 positions. The actual voltage levels applied to the piezoelectric element 528 are a function design choice and vary according to the tension force of the selected spring and the desired position of the mirror 518. According to design choice, variable voltage levels or a different number of predetermined voltage levels may be used to control mirror 518 positioning.

While the embodiment of FIG. 7 comprises a piezoelectric element 528 to control the position of the mirror, other similar devices may be used as well. For example, a solenoid or linear motor may be used in its place.

Continuing to refer to FIG. 7, what is shown is a side view of turnstile 500 to illustrate a structure for transmitting a beam 510 in a direction which is not two-dimensional meaning that it is not parallel to the turnstile base 514. As with the embodiment of FIG. 2, the turnstile 500 of FIG. 7 rotates to eight different positions. Therefore, the embodiment of FIG. 7 is adapted for transmitting an electromagnetic beam 510 in a total of 17 directions. In addition to transmitting 17 the beam 510 vertically and perpendicular to the turnstile base 514 in direction 516, the turnstile 500 can transmit the beam in two different directions, e.g. 522 and 524, for each of the eight turnstile positions demonstrated in FIG. 3.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. An electromagnetic radiation data transfer system, comprising:

a first data link having a first means for transmitting an at least one beam of electromagnetic radiation in a plurality of directions and a first means for receiving said at least one beam of electromagnetic radiation;

a second data link having a second means for transmitting an at least one beam of electromagnetic radiation and a second means for receiving an at least one beam of electromagnetic radiation;

a means for generating a plurality of test signals connected to said first means for transmitting and to said second means for receiving wherein each of said plurality of test signals is transmitted in each of said plurality of directions by said first means for transmitting an at least one electromagnetic beam; and a means for analyzing each of said plurality of test signals received by said first means for receiving, said means for analyzing determining which of said test signals transmitted in said plurality of directions were received most clearly and transmitting the results of its analysis to said means for generating over said second data link.

2. The electromagnetic data transfer system of claim 1 wherein the first means for transmitting an at least one beam of electromagnetic radiation is comprised of a turnstile for rotating and aiming said at least one beam of electromagnetic radiation.

3. The electromagnetic data transfer system of claim 2 wherein said means for transmitting is comprised of a means for transmitting a beam of light and wherein said electromagnetic beam comprises a beam of light.

4. The electromagnetic data transfer system of claim 3 wherein said turnstile further comprises a pivoting mirror for reflecting said electromagnetic beam in a plurality of reflected directions.

5. The electromagnetic data transfer system of claim 4 wherein said means for transmitting transmits said beam of light in a direction vertical to a plane of said turnstile and wherein said pivoting mirror is adapted for reflecting said beam in a three dimensional directions which include directions not in a plane parallel to said plane of said turnstile.

6. The electromagnetic data transfer system of claim 4 wherein the plurality of three dimensional directions is equal to two.

7. The electromagnetic data transfer system of claim 3 wherein said means for transmitting further comprises a plurality of light beam generating devices wherein each of the light beam generating devices transmits a beam in one of said plurality of predetermined directions.

8. The electomagnetic data transfer system of claim 7 which further comprises a plurality of pivoting mirrors, one for every light beam generating device, wherein each mirror is pivotally mounted adjacent to and adapted for reflecting the beam of light produced by its corresponding beam generating device.

9. An electromagnetic data transfer system, comprising:

a transmitter CPU;

a receiver CPU;

a first data link therebetween and connected to said transmitter CPU and said receiver CPU, said first data link being comprised of an electromagnetic beam transmitter capable of transmitting electromagnetic beam test signals in a plurality of three dimensional directions and of an electromagnetic beam receiver; and a second data link therebetween and connected to said transmitter CPU and said receiver CPU, said second data link being comprised of an electromagnetic beam transmitter and of an electromagnetic beam receiver;

wherein the electromagnetic beam transmitter comprises a means for reflecting a vertically transmitted beam in said plurality of three dimensional directions, and wherein the electromagnetic beam transmitter further comprises a turnstile wherein said turnstile rotates to a plurality of predetermined different directions.

10. The electromagnetic data transfer system of claim 9 wherein the plurality of three dimensional directions is equal to three, one of the three being perpendicular to the turnstile base.

11. The electromagnetic data transfer system of claim 10 wherein said plurality of predetermined different directions is equal to eight.

12. A method for transmitting data, comprising the steps of:

transmitting a test signal in a plurality of directions from a multi-directional electromagnetic transmitter;

determining an optimum number of transmission directions;

transmitting a data block in each of the optimal directions; and ensuring the data was correctly received.

13. The method of claim 12, wherein said step of ensuring the data was correctly received comprises the step of retransmitting data that was not correctly received.

14. The method of claim 13, wherein said step of ensuring the data was correctly received further comprises the step of redetermining an optimum number of transmission directions.

15. The method of claim 14 wherein the step of transmitting a test signal further comprises the steps of rotating a turnstile to a plurality of turnstile positions and of positioning a mirror in a plurality of mirror positions, wherein the mirror is positioned in each of the plurality of mirror positions for each of the plurality of turnstile positions and wherein the test signal is transmitted from each of the combination of mirror and turnstile positions.

16. The method of claim 15 wherein the number of mirror positions is equal to three, one of the three being perpendicular to the turnstile base.

17. The method of claim 16 wherein the number of turnstile positions is equal to eight.

* * * * *

UNITED STATES PATENT AND TRADEMARK OFFICE
CERTIFICATE OF CORRECTION

PATENT NO. : 5,650,868
DATED : Jul. 22, 1997
INVENTOR(S) : Rossi

It is certified that error appears in the above-identified patent and that said Letters Patent is hereby corrected as shown below:

Column 2, line 65    Replace "transmitter."
                     With --transmitter;--

Column 8, line 60    After "transmitting"
                     Remove --17--

Column 9, line 55    Replace "electomagnetic"
                     With --electromagnetic--

Signed and Sealed this

Twenty-ninth Day of December, 1998

Attest:

BRUCE LEHMAN

Attesting Officer          Commissioner of Patents and Trademarks